(12) United States Patent
Kim

(10) Patent No.: US 6,545,664 B1
(45) Date of Patent: Apr. 8, 2003

(54) HEAD OPERATED COMPUTER POINTER

(76) Inventor: Tong Kim, 8419 N. Keystone, Skokie, IL (US) 60076

( * ) Notice: Subject to any disclaimer, the term of this patent is extended or adjusted under 35 U.S.C. 154(b) by 0 days.

(21) Appl. No.: 09/676,611

(22) Filed: Sep. 29, 2000

Related U.S. Application Data

(63) Continuation-in-part of application No. 09/157,030, filed on Sep. 18, 1998, now abandoned.

(51) Int. Cl.[7] ................................................. G09G 5/08
(52) U.S. Cl. ........................................ 345/158; 345/156
(58) Field of Search ........................ 345/158, 156–157, 345/163–166; 701/220; 73/504.12, 504.14, 504.13

(56) References Cited

U.S. PATENT DOCUMENTS

| | | | |
|---|---|---|---|
| 4,565,999 A | 1/1986 | King et al. ................... 345/158 |
| 4,682,159 A | 7/1987 | Davison ....................... 345/158 |
| 5,367,315 A | 11/1994 | Pan ............................. 345/156 |
| 5,440,326 A * | 8/1995 | Quinn .......................... 345/156 |
| 5,594,169 A | 1/1997 | Field et al. ............... 73/504.14 |
| 5,635,957 A | 6/1997 | Feierbach et al. ........... 345/163 |
| 5,734,371 A * | 3/1998 | Kaplan ......................... 345/158 |
| 5,825,350 A | 10/1998 | Case, Jr. et al. ............. 345/163 |
| 5,826,578 A | 10/1998 | Curchod ...................... 600/595 |
| 5,916,181 A | 6/1999 | Socci et al. .................. 600/595 |
| 6,249,274 B1 * | 6/2001 | Svancarek et al. ........... 345/158 |

* cited by examiner

*Primary Examiner*—Richard Hjerpe
*Assistant Examiner*—Frances Nguyen
(74) *Attorney, Agent, or Firm*—Schiff, Hardin & Waite

(57) ABSTRACT

A pointer control for movement of a pointer or cursor across a computer display includes a movement sensor mounted on a headband to translate motions of a user's head into movements of the pointer. The movement sensor may be an inertia sensor. Wired and wireless configurations are provided. Selection switches for selection of the graphical elements indicated by the pointer are provided in an auxiliary keyboard module for mounting on the keyboard or alternately as foot operated switches. Add-on modules convert the head movement sensor to a hand-moved sensor. A laser pointer may be provided.

16 Claims, 2 Drawing Sheets

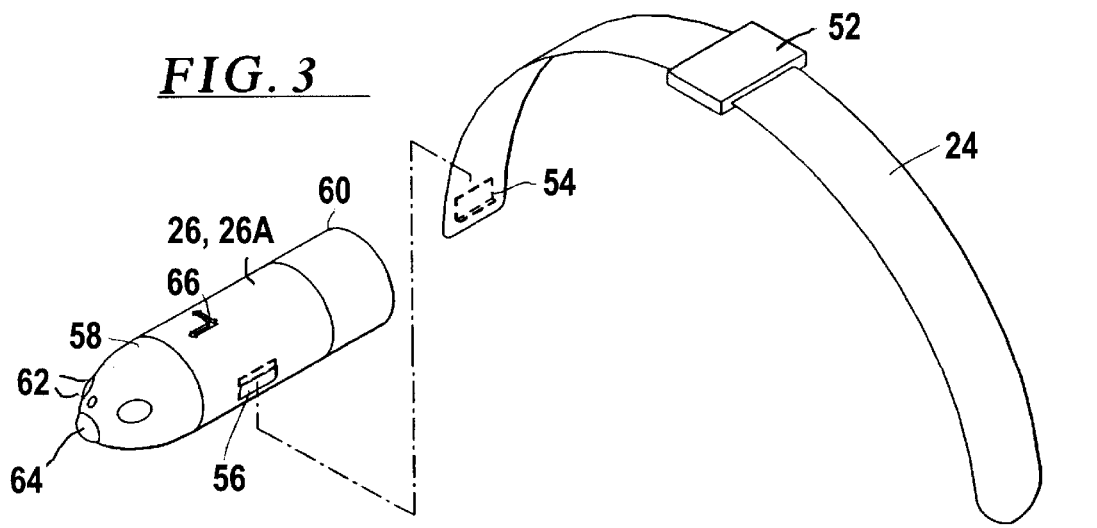
FIG. 3
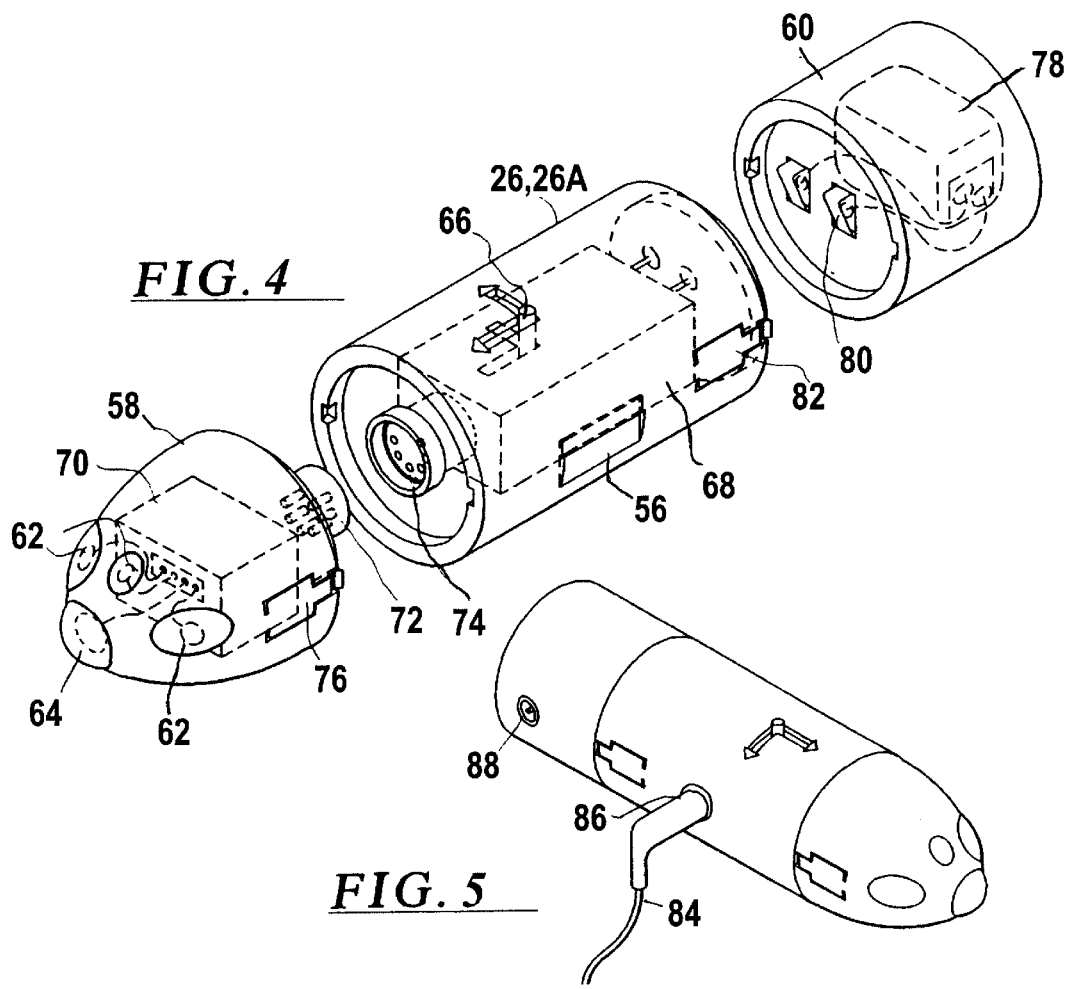
FIG. 4
FIG. 5

HEAD OPERATED COMPUTER POINTER

CROSS-REFERENCE TO RELATED APPLICATION

This is a Continuation-In-Part Application of application Ser. No. 09/157,030, filed Sep. 18, 1998 now abandoned, which is incorporated herein by reference.

BACKGROUND OF THE INVENTION

1. Field of the Invention

The present invention relates generally to a device for operating an on-screen pointer for a computer or other software driven device, and in particular to a head operated computer pointer.

2. Description of the Related Art

Personal computers developed from a text-based interface to a graphical user interface wherein graphical elements appearing on the display screen are selected by a combination of keyboard and pointer operations. The pointer is moved about in the field of the screen by manually moving a mouse across a work surface. The mouse transmits the movements in the plane of the work surface to movements of the pointer on screen. The mouse additionally includes two or more buttons which through single or double click operations selects various on screen elements of the graphical user interface, causing corresponding operations to be performed on the computer.

Various replacements for the mouse as a device for moving the computer pointer have been developed. These include so-called track balls where a ball is operated directly by the user's hand, touch screens which include a touch sensitive surface that the user moves a finger tip over, and pointing sticks, also referred to as joy sticks or game pads, which are moved by the hand and held at a single point in a multi-directional swivel connection. Each of the known pointing devices for computers are manipulated by the user's hand, requiring that the user remove the hands from the typing position on the keyboard to operate the pointing device.

Devices are known which control a computer cursor movement using infra-red or ultrasound emitters and sensors to sense movement of a user's head. A device is also known which mechanically connects bands about a user's head and chest to sense movement of the neck and thereby control cursor movement on a computer.

SUMMARY OF THE INVENTION

An object of the present invention is to permit the user to keep the user's hand in the typing position on the computer input keyboard while enabling the user to simultaneously move the pointer across the field of the computer display screen. Another objective of the present invention is to speed up input and increase efficiency of computer input. A further objective of the invention is to enable telephone operators to use a computer interface while on the phone. Yet another objective of the invention is to provide a versatile pointing device which may be used in a hands-free mode and which may be converted to a hand operated mode. A further object of the invention is to provide an additional dimension of control for enhanced control of computer devices.

These and other objectives and advantages of the invention are provided by a head operated computer pointing device which translates the movements of the computer user's head into movements of the pointer in the field of the computer display screen. A spacial movement sensor is held in position on the user's head such as by a headband. In one embodiment, the movement sensor is an inertia sensor that senses changes in position of the sensor, and thus the user's head. The spacial motion sensor is attached to one side of the headband and communicates changes in spacial position of the user's head to the computer to move the pointer across the field of the display screen. In one embodiment, the spacial movement sensor is connected to a computer input port, such as a serial mouse port, by a cable. In an alternate embodiment, the spatial movement sensor includes a radio frequency transmitter and/or infrared transmitter for wirelessly communicating spatial movement signals to a receiver connected to the computer. The receiver is a radio frequency receiver and/or infrared signal receiver and is connected, for example, to the serial mouse port of the computer.

The present invention also provides selecting or clicking keys for mounting to a computer keyboard which correspond to the keys of a mouse for performing clicking, dragging or double clicking operations. In a preferred embodiment, two or three keys are mounted in a small auxiliary keyboard panel for mounting to the keyboard of the computer below the space bar. The mounting may be accomplished adhesive, or hook or loop fastener, such as a velcro brand fastener are other attachment means. A cable runs from the auxiliary keyboard module containing the two selecting keys to the computer. The cable for the auxiliary keyboard module is connected at a Y connector with the cable from the spatial movement sensor in the wired embodiment of the spatial movement sensor. In the wireless embodiment, the cable from the auxiliary keyboard module is connected to the receiver, such as the infrared and/or radio frequency receiver for the wireless spatial position sensor.

The connection of the combined spatial position sensor and auxiliary keyboard module to the computer is preferably accomplished using a standard plug of the type used for connecting a mouse to the computer so that the present device may be connected to the computer in place of a standard mouse.

An option for the present invention is to provide foot pedals for the selection keys in place of the auxiliary keyboard module.

In another embodiment, the spatial movement sensor is connected to a standard telephone head set so that the telephone user, such as a operator or receptionist, may operate a computer pointer using head movements while speaking on the telephone and while keeping the telephone user's hands free for taking notes or using the keyboard.

A further improvement of the present invention provides that the spatial movement sensor is selectively removable from the headband for manipulation by the computer operator's hand to position the computer pointer on the display screen field. An add on module may be provided for attachment to the spatial movement sensor which incorporates selection buttons, thereby transforming the head operated pointing device to a hand operated pointing device for movement in three dimension space. A further option is a battery module for connection to the spatial movement sensor to power the circuitry such as infrared and/or radio frequency transmitter in the wireless embodiments. A further option of the present invention provides a laser pointer built into the selection button module so that when the computer pointing device is used in a hand operated mode it may additionally be used as a laser pointer. The housing of the hand operated embodiments is preferably configured to fit the shape of the user's hand.

In a further embodiment, the spatial movement sensor is utilized with other pointing devices for enhanced cursor control.

BRIEF DESCRIPTION OF THE DRAWINGS

FIG. 3 is a perspective view of a user's head set incorporating the present head operated computer pointing device;

FIG. 4 is a perspective view of the present computer pointing device including add on modules for selection buttons, a laser pointer, and an additional battery compartment; and FIG. 5 is a perspective view of the pointing device for hand operation.

DETAILED DESCRIPTION OF THE PREFERRED EMBODIMENTS

Figure 1:
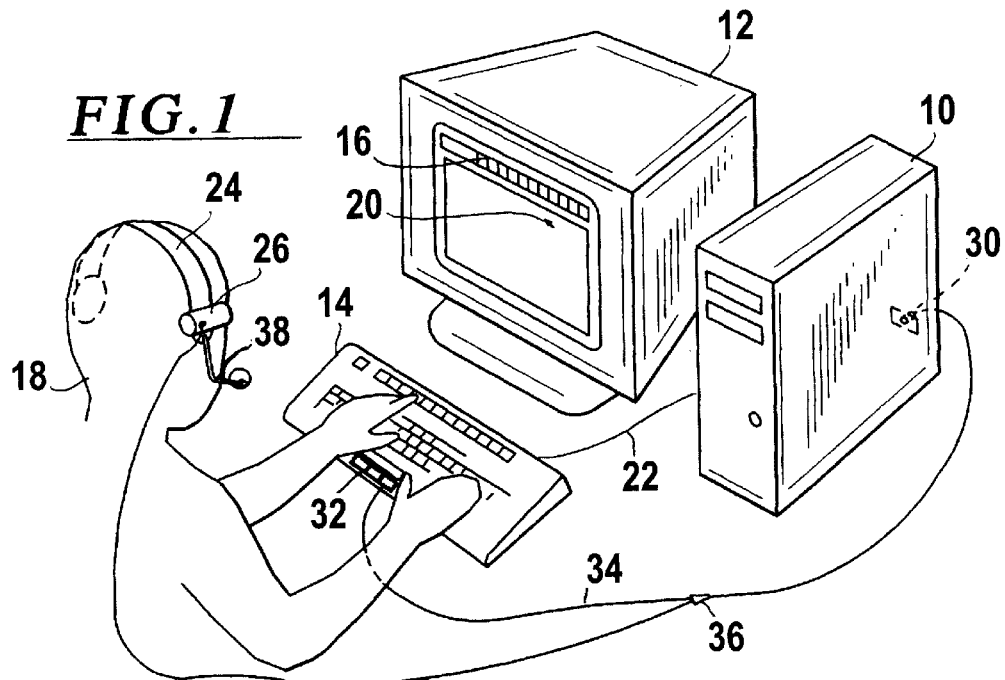
FIG. 1 is a schematic diagram of the head operated pointing device including an auxiliary keyboard module connected to a personal computer including a telephone headset option.

In FIG. 1 is shown a computer 10 such as a personal computer which includes the main computer box 10, a separate viewing screen 12, and a keyboard 14. The personal computer 10 is operated by software which provides a graphical user interface on the viewing screen 12, including graphical elements 16 for selection by the computer user, who is indicated by a reference character 18. The selection of the graphical element 16 on the viewing screen 12 is typically accomplished by moving a pointer 20 to the graphical element 16 and operating a selection switch. The movement of the pointer 20 across the field of the view screen 12 may be accomplished by manipulating keys on the keyboard 14, which is connected to the main computer unit 10 by a cable 22. However, the user prefers to use a separate control for movement of the pointer 20.

For purposes of the present invention, the term computer includes all software driven devices that use an external sensor for sensing movement, including electronic games, network access devices including Internet access devices, control of toys and robotic control.

According to the present invention, the user 18 wears a headband 24 on which is provided a movement sensor or inertia sensor 26. The movement sensor 26 is connected to the main computer unit 10 by a cable 28. Movement of the user's 18 head is sensed by the movement sensor 26 and the sensed motion is transmitted to the main computer unit 10 via the cable 28 to move the pointer 20 across the field of the view screen 12. Head movement in two or three planes is sensed. In a preferred embodiment, the movement sensor 26 generates an output signal compatible with a so-called mouse pointing device so that the cable 28 may be connected to a standard mouse port 30 at the main computer unit 10.

Since not only must the pointer 20 be moved across the field of the view screen 12, but also a selection function must be performed when the pointer 20 is overlaying a graphical element 16 to be selected, the present invention also provides an auxiliary keyboard module 32 including selection switches. The auxiliary keyboard module 32 is connected to the main computer unit 10 by a cable 34. As shown in FIG. 1, a Y connection 36 combines the cables 28 and 34 into a single cable which is connected at the mouse port 30. The auxiliary keyboard module 32 may be a separate module containing the selection keys which is positioned on the keyboard 14 within reach of the user's fingers or thumbs. Alternatively, the auxiliary keyboard module 32 may be built into the keyboard 14.

The auxiliary keyboard module 32 of the illustrated embodiment includes three selection buttons, as is known from mouse-type pointing devices. Two button selection devices are also known and therefore the auxiliary keyboard module may include two keys instead of the illustrated three keys.

The user 18 is therefore able to operate the computer including moving the pointer 20 across the filed of the view screen 12 and selection of graphical element 16 on the view screen without removing the user's hands from the keyboard 14. Input speed and operating efficiency for the user of the computer is increased accordingly.

The embodiment illustrated in FIG. 1 includes an optional telephone headset 38 mounted on the headband 24. The user 18 may carry on telephone conversations also in a hands free mode of operation. It is not required however that the present invention utilize a telephone headset but only that the movement sensor 26 be mounted to a headband 24 for sensing the user's head movement.

The auxiliary keyboard module 32 is shown positioned below the space bar of the keyboard 14. By providing the auxiliary keyboard module 32 as a removable unit, the user 18 may select the position on the keyboard most efficient for that user, including positioning the auxiliary keyboard module adjacent to the number keypad of the keyboard or at some other location. It is also possible for the user to remove the auxiliary keyboard module 32 entirely from the keyboard and position it as the user wishes. For this purpose, the auxiliary keyboard module 32 is affixed by a removable fastener, such as an adhesive or a hook and loop fastener.

Figure 2:
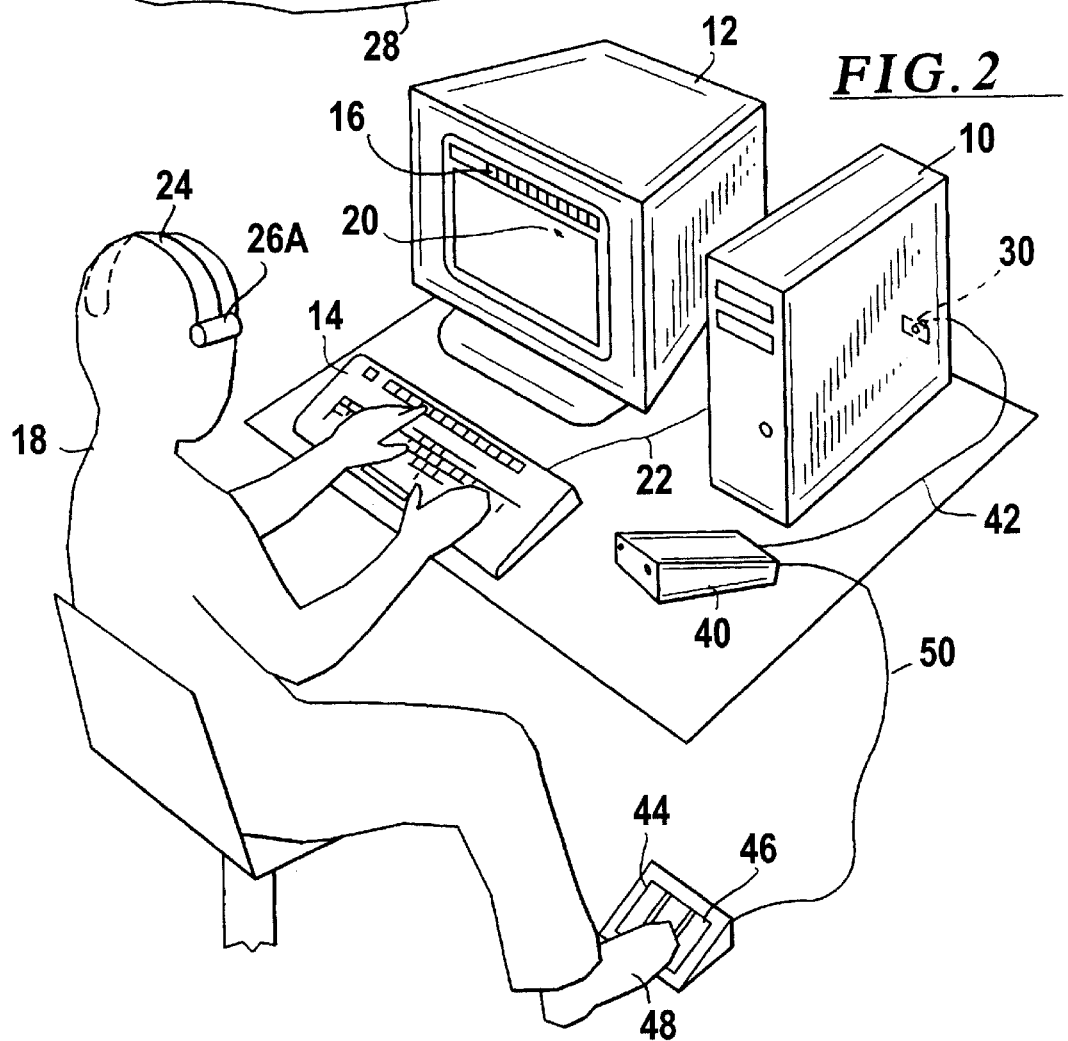
FIG. 2 is a schematic drawing of a wireless configuration of the present head operated computer pointing device with a foot operated selection switched for use in place of the auxiliary keyboard module, according to the principles of the present invention.

Referring to FIG. 2, alternative features of the present invention are illustrated including a wireless motion sensor 26a on the headband 24 which is worn by the user 18. Not only does the movement sensor 26a include a movement sensing apparatus, but also a signal transmitter is provided to transmit movement signals to a base unit 40. The signal transmitter may be an infrared signal transmitter and/or a radio frequency signal transmitter and the base unit 40 is a corresponding receiver of such signals. The user 18 is thus not constrained by a wire worn on the user's body and is free to move about the work space without limitation.

The base unit 40 is connected via a cable 42 to the mouse port 30 on the base computer unit 10. The movement signals from the movement sensor 26a thus are communicated to the computer 10 to cause movement of the pointer 20 across the field of view of the view screen 12.

The wireless embodiment of the present pointing device may be provided with the auxiliary keyboard module 32 of FIG. 1, the cable 34 from the auxiliary keyboard module 32 being connected to the base unit 40. In FIG. 2, however, a further improvement of the present invention as illustrated including a foot operated selection switch 44 including either two or three foot pedals 46. The foot pedals 46 are operated by the user's foot 48 to activate the selection of graphical elements 16 on the view screen 12. Selection signals from the foot operated selection switches 44 are communicated in the illustrated embodiment to the base unit 40 via a cable 50. In an alternative embodiment, the selection switches and foot pedals are wireless. Thus, the user 18 may move the pointer 20 across the filed of view screen 12 by movement of the user's head and may activate the selection keys 46 by movement of the user's foot 48.

The foot operated selection switch 44 may be provided in a wired embodiment of the pointing device as shown in FIG. 1, in place of the auxiliary keyboard module 32.

In FIG. 3 is shown an enlarged view of the headband 24 within adjustment slide 52 that permits the headband 24 to be adjusted for comfort while being worn on the user's head. On the headband 24 is a connector 54 which permits removable connection of the movement sensor 26 or 26a to the headband 24. The movement sensor 26 or 26a has a cooperating attachment means 56 provided thereon.

As shown in FIG. 3, the movement sensor 26 or 26a serves as a base unit which may be expanded by add-on modules 58 and 60. The add-on module 58 is affixed to one end of the base unit 26 or 26a and includes selection buttons 62 and a laser output 64. The second add-on module 60 is provided connected to the opposite end of the base unit 26 or 26a.

By removal of the movement sensor 26 or 26a from the headband 24, and by attachment of the add-on modules 58 and 60, the assembled unit may be held comfortably in a user's hand and by operation of the selection buttons 62 by a user's thumb or finger, the present device may be operated completely by the user's hand. To facilitate change over from the head mounted operation to the hand held operation, a mode switch is provided on the motion sensor 26 or 26a. The mode switch 66 switches sensing of the movement from movements typical to the head worn movement sensor to movements by the user's hand, such as reversing planes of sensing or inverting direction of sensing.

FIG. 4 provides additional detail on the optional hand operated configuration of the present movement sensor. Within the base unit 26 or 26a as provided an inertia sensor element 68 operating to sense movement by changes in inertia, similar to a gyroscopic inertia sensor but without the rotating mass. The preferred inertia sensor senses movement in at least two planes. In one embodiment, the piezoelectric inertia sensing element 68 includes a vibrating element in each sensed plane which is monitored by electronic circuitry to determine the movement of the sensor unit. An example of such an inertial movement sensor is part No. MicroGyro 100 manufactured by Gyration, Inc.

The mode selection switch 66 may be seen on the base unit 26 or 26a as well as the connector 56 for the headband. Within the first add on module 58 is a circuit module 70 for receiving the selection signals of the selection switches 62 and transmitting these two the base unit 26 or 26a via a connector 72 which cooperates with a corresponding connector 74 in the base unit. Attachment clips 76 are provided on the first add on module 58 as well to secure the add on module 58 to the base unit.

When operated as a hand held unit, the user may desire to utilize a laser pointer to point to items, such as is common during presentations at meetings. Thus, the laser output window 64 is provided at the front end of the add on module 58 having a laser which is selectively activated by the user through the selection switches 62. Additional functionality of the present device is thereby provided.

Since the additional circuitry of the add-on module 58 draws more current than the movement sensor 68 alone, and in particular additional current is drawn by the laser 64, the second add on module 60 includes a battery 18 therein to power these additional components. The battery 78 is electrically connected into the circuitry of the present device by battery contacts 80 at a connector interface which is facilitated by connector clips 82. The location of the connector clips 82 and 76 may be interchanged from that illustrated in FIG. 4.

FIG. 5 shows a connection of the present device for hand held operation including the laser pointer and a wire for wired operation. The wire 84 is connected via a plug 86 which is connectable to the device. A further connector 88 may be provided as desired for supplying external power to the device.

Thus, there is shown and described a hands free pointing device for utilizing head movements of the user to move the pointer across the field of view of a computer screen. The present pointer device is convertible to hand held operation and includes a laser pointer as desired by the user. The present pointing device may be either wired or a wireless configuration. By using an inertia sensor for sensing head movement, the movement sensor avoids the problems which result from the use of sensors requiring sensing fields, such as the user moving out of the sensing field, or turning so that the sensors are no longer directed toward the field emitter. No mechanical linkage is required to be mounted on the user's body to sense movement of the user's neck, either.

Although other modifications and changes may be suggested by those skilled in the art, it is the intention of the inventors to embody within the patent warranted hereon all changes and modifications as reasonably and properly come within the scope of their contribution to the art.

I claim:

1. A pointer control for use with a computer having a display including graphical elements for selection, comprising:

a movement sensor capable of sensing movement, said movement sensor being an inertia sensor;

a head support for engagement with a user's head, said movement sensor being mounted on said head support to sense head movement of a user for translation into movement signals;

selection switches separate from said movement sensor, said selection switches being selectively activated by a user to select ones of the graphical elements;

a communication link between said movement sensor and the computer to cause movement signals sensed by said movement sensor to be communicated to the computer so as to be displayed as movements of a pointer on the display of the computer;

a further communication link communicating selection signals from said selection switches to the computer;

said movement sensor being, removably mounted on said head support and being capable of sensing movement when removed from said head support and held in a user's hand; and an orientation switch on said movement sensor for selectively switching between orientation of sensor signals corresponding to head movements translated to pointer movements and orientations of signals for hand movements translated to pointer movements.

2. A pointer control as claimed in claim 1, wherein said head support is a headband to be worn on the user's head.

3. A pointer control as claimed in claim 1, wherein said communication link includes a cable connected between said movement sensor and the computer.

4. A pointer control as claimed in claim 1, wherein said communication link includes a wireless transmitter and a wireless receiver.

5. A pointer control as claimed in claim 4, wherein said wireless transmitter and said wireless receiver operate at radio frequencies.

6. A pointer control as claimed in claim 4, wherein said wireless transmitter and said wireless receiver operate at infrared frequencies.

7. A pointer control as claimed in claim 1, wherein said selection switches include an auxiliary keypad for selective operation by a user's hand.

8. A pointer control as claimed in claim 7, wherein said auxiliary keypad is attached to a keyboard of the computer.

9. A pointer control as claimed in claim 1, wherein said selection switches include foot pedals for operation by a user's foot.

10. A pointer control as claimed in claim 1, wherein said movement sensor is removably mounted on said head support and is capable of sensing movement when removed from said head support and held in a user's hand.

11. A pointer control as claimed in claim 10, further comprising:
   an auxiliary module for selective connection to said movement sensor, said auxiliary module including:
      selection switches operable by a user's hand while holding said movement sensor to select ones of the graphical elements.

12. A pointer control as claimed in claim 11, further comprising:
   a battery module for selective connection to said movement sensor, said battery module including a battery connected to power circuitry in said movement sensor.

13. A pointer control as claimed in claim 1, wherein said communication link includes a Y-connection linking said movement sensor and said selection switches and the computer.

14. A pointer control as claimed in claim 1, wherein said communication link includes:
   a receiver housing with a receiver for receiving wireless signals;
   a cable connecting said receiver housing to the computer; and
   a transmitter for transmitting wireless signals from said movement sensor to said receiver of said receiver housing.

15. A pointer control as claimed in claim 14, further comprising:
   a cable connecting said selection switches to said receiver housing.

16. A pointer control for use with a computer having a display including graphical elements for selection, comprising:
   a movement sensor capable of sensing movement, said movement sensor being an inertia sensor;
   a head support for engagement with a user's head, said movement sensor being mounted on said head support to sense head movement of a user for translation into movement signals;
   selection switches separate from said movement sensor, said selection switches being selectively activated by a user to select ones of the graphical elements;
   a communication link between said movement sensor and the computer to cause movement signals sensed by said movement sensor to be communicated to the computer so as to be displayed as movements of a pointer on the display of the computer;
   a further communication link communicating selection signals from said selection switches to the computer;
   said movement sensor being removably mounted on said head support and being capable of sensing movement when removed from said head support and held in a user's hand;
   an auxiliary module for selective connection to said movement sensor, said auxiliary module including:
      selection switches operable by a user's hand while holding said movement sensor to select ones of the graphical elements; and
   a laser emitter mounted in said auxiliary module.

* * * * *